UNITED STATES PATENT OFFICE.

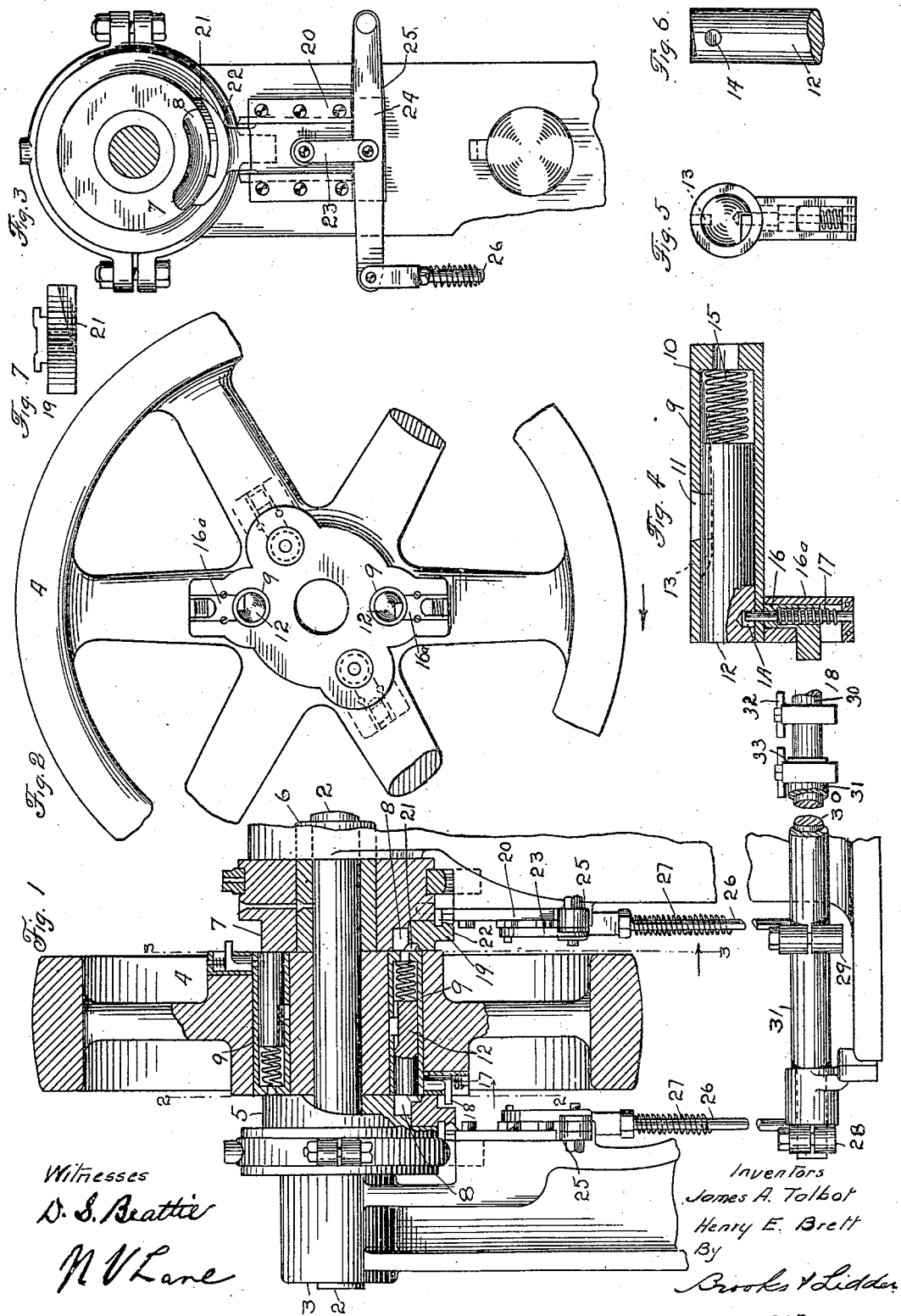

JAMES A. TALBOT AND HENRY E. BRETT, OF LOS ANGELES, CALIFORNIA.

CLUTCH MECHANISM.

951,084.    Specification of Letters Patent.    Patented Mar. 1, 1910.

Original application filed March 10, 1909, Serial No. 482,413. Divided and this application filed July 27, 1909. Serial No. 509,901.

*To all whom it may concern:*

Be it known that we, JAMES A. TALBOT and HENRY E. BRETT, citizens of the United States of America, residing at Los Angeles, in the county of Los Angeles, State of California, have invented a certain new and useful Clutch Mechanism; and we do hereby declare the following to be a full, clear, and exact description of the invention, such as will enable others skilled in the art to which it appertains to make and use the same.

This application is a division of application Serial No. 482,413, filed March 10, 1909.

The invention relates to clutch mechanism, particularly to that class in which a driving member may be operatively connected to either of two driven members and automatically disengaged upon the completion of a definite number of revolutions.

It is an object of the invention to provide a clutch mechanism wherein a single driving member may be operatively connected at will by independently controlled means to either or both of two coaxial shafts extending in the same direction to one side of the driving member and driving independent mechanisms.

Other objects and the advantages of the invention will be apparent to those skilled in the art from the following description of one form of mechanism in which it may be embodied, taken in connection with the accompanying drawings, in which—

Figure 1 is a central section, partly broken away, of the clutch mechanism and connected parts; Fig. 2 is a section on line 2—2 of Fig. 1, the central shaft being removed; Fig. 3 is a section on line 3—3 of Fig. 1; Fig. 4 is an enlarged section of the clutch-pin sleeve, showing the associated parts; Fig. 5 is an end elevation of the parts shown in Fig. 4; Fig. 6 is a detail of the clutch pin; Fig. 7 is a plan of one of the clutch cams.

The shaft 2 may be journaled in bearings such as are designated by numeral 3, which may be carried on the apparatus of which the clutch mechanism forms a part. Upon shaft 2 is loosely mounted driving member 4, consisting in this instance of a fly wheel, the periphery of which is adapted to receive a driving belt whereby the clutch may be connected to any suitable source of power (not shown).

A driven member 5 is rigidly mounted upon shaft 2 adjacent to one of the faces of driving member 4. A tubular shaft 6 is loosely mounted upon shaft 2 and has rigidly affixed thereto a driven member 7 adjacent to the other face of driving member 4. Shaft 2 and tubular shaft 6 may be operatively connected to any part or parts it is desired to drive independently of each other. Driven members 5 and 7 have in their sides next to the driving member 4 recesses 8, the wall at one end of which may, if desired, receive a wear-resisting piece of hardened material.

Driving member 4 has therein holes in which are pressed sleeves 9 (Figs. 1 and 2). Each sleeve has at one end an internal shoulder 10 (Fig. 4) and near its middle part a feather 11.

As will be seen in Figs. 1 and 2, the open ends of two of the sleeves are toward driven member 5 and those of the other two sleeves are toward driven member 7. A clutch pin 12 having a key way 13 and a hole 14, fits slidably in sleeve 9, being pressed outwardly by spring 15 interposed between its end and shoulder 10. A latch case 16 is let into driving member 4 adjacent to each of sleeves 9, and therein slides a latch 16, one end of which is normally held in hole 14 by spring 17. Latch 16 has a lug 18 which projects from the face of driving member 14 and is engaged by one of the clutch cams 19. These cams are slidably mounted in guides 20 attached to the frame of the apparatus. Each cam 19 has a surface 21 in form a segment of a helix, which, when the cam is in normal position, engages the end of any one of pins 12 which may be out and pushes said pin inwardly against the pressure of spring 15. That part of the cam designated by numeral 22, when the cam is depressed, engages lug 18 and pushes it downwardly against the pressure of spring 17, withdrawing the latch 16 from hole 14 and allowing pin 12 to be projected into one of the recesses 8. Thus it will be seen that a downward movement of one or the other of cams 19 connects the driving member 4 with the driven members 5 or 7. Any suitable mechanism may be employed to actuate cams 19. For instance, they may be connected by links 23 with levers 24 fulcrumed on brackets 25 attached to the frame of the apparatus. To levers 24 may be connected rods 26, upwardly pressed by springs 27. The lower ends of rods 26 may be attached to levers 28 and 29, which may be respectively attached to shaft 30 and hollow shaft 31 mounted thereon. These concentric shafts 30 and 31 may respectively have connected thereto foot-pedals 32 and 33 whereby they may be partially rotated to actuate cams 19.

While one form of clutch mechanism in which the invention may be embodied has been illustrated and described, it is obvious that various modifications and changes may be made therein, and the right is reserved to all such modifications and changes as do not depart from the spirit and scope of the invention.

We claim:

1. In a clutch mechanism, the combination of two concentric shafts, with a single driving member on one of said shafts, a driven member on each of said shafts at each side of the driving member, means independent of each other associated with each of the driven members whereby said driving member may be operatively connected to either of said driven members, and independently controlled means for actuating said first means.

2. In a clutch mechanism, the combination of two concentric shafts, with a single driving member on one of said shafts, a driven member on each of said shafts at each side of the driving member, and means independent of each other associated with each of the driven members whereby said driving member may be connected to either or both of said driven members at will.

3. In a clutch mechanism, the combination of a single driving member, a shaft upon which said driving member is loosely mounted, a driven member affixed to said shaft, a tubular shaft on said first shaft, a driven member on said tubular shaft, means whereby said driving member may be operatively connected to either of said driven members, and independent mechanisms controllable at will for actuating said means, substantially as described.

4. In a clutch mechanism, the combination of a single driving member, a shaft upon which said driving member is loosely mounted, a driven member affixed to said shaft, a tubular shaft on said first shaft, a driven member on said tubular shaft, means whereby said driving member may be operatively connected to either of said driven members, and independent mechanisms controllable at will for actuating said means, said mechanisms each comprising a cam operatively connected with a shaft having a foot pedal thereon, the operating shaft of one mechanism being mounted on the shaft of the other mechanism, substantially as described.

5. In a clutch mechanism, the combination of a single driving member, a driven member at each side thereof, independent means associated with each of the driven members whereby said driving member may be operatively connected to either of said driven members, and mechanisms for actuating said means, said mechanisms each including a shaft having a foot-pedal thereon and arranged concentric with the shaft on the other mechanism, substantially as described.

In testimony whereof, we have signed our names to this specification in the presence of two subscribing witnesses at Los Angeles, county of Los Angeles, State of California, this 21st day of July A. D. 1909.

JAMES A. TALBOT.
HENRY E. BRETT.

Witnesses:
ALEX. H. LIDDERS,
HARRY A. BROOKS.